(12) United States Patent
Ushiyama et al.

(10) Patent No.: US 9,914,379 B2
(45) Date of Patent: Mar. 13, 2018

(54) VEHICLE SEAT

(71) Applicant: TOYOTA BOSHOKU KABUSHIKI KAISHA, Aichi-ken (JP)

(72) Inventors: Takeshi Ushiyama, Aichi-ken (JP); Hideo Sahashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 105 days.

(21) Appl. No.: 14/694,522

(22) Filed: Apr. 23, 2015

(65) Prior Publication Data

US 2015/0307004 A1    Oct. 29, 2015

(30) Foreign Application Priority Data

Apr. 25, 2014    (JP) .................. 2014-091090

(51) Int. Cl.
*B60N 2/64* (2006.01)
*B60N 2/60* (2006.01)
*B60N 2/58* (2006.01)
*B60N 2/68* (2006.01)

(52) U.S. Cl.
CPC .......... *B60N 2/646* (2013.01); *B60N 2/5816* (2013.01); *B60N 2/5825* (2013.01); *B60N 2/6009* (2013.01); *B60N 2/6018* (2013.01); *B60N 2/6027* (2013.01); *B60N 2/68* (2013.01)

(58) Field of Classification Search
CPC ...... B60N 2/5816; B60N 2/58; B60N 2/5825; B60N 2/6018; B60N 2/60; B60N 2/646; B60N 2/6009; B60N 2/68
USPC ................. 297/452.59, 218.4, 218.3, 452.18
See application file for complete search history.

(56) References Cited

U.S. PATENT DOCUMENTS

| 2,120,036 A | * | 6/1938 | Northup ............... B60N 2/7041 297/218.3 |
| 2,361,370 A | * | 10/1944 | Grunwald ................ A47C 7/26 297/228.11 |
| 2,608,243 A | * | 8/1952 | Kostrowski .......... A47C 31/026 297/218.3 |
| 2,644,510 A | * | 7/1953 | Benmax ................. A47C 31/02 297/218.3 |
| 3,003,816 A | * | 10/1961 | Wilson ................... A47C 31/11 297/228.11 |

(Continued)

FOREIGN PATENT DOCUMENTS

| JP | 8-336447 | 12/1996 |
| JP | 10-211061 | 8/1998 |
| JP | 2000-184940 | 7/2000 |

(Continued)

OTHER PUBLICATIONS

Chinese Office Action for CN App. No. 201510206370.5 dated Nov. 18, 2016, along with English-language translation thereof.

*Primary Examiner* — Milton Nelson, Jr.
(74) *Attorney, Agent, or Firm* — Greenblum & Bernstein, P.L.C.

(57) ABSTRACT

A carpet which forms a terminal of a cushion cover is folded back in a direction opposite to a direction in which the carpet extends from the cushion cover to form a folded portion, a wire is enclosed inside the folded portion to stitch the carpet, a locking hole is opened in a position of the folded portion closer to a cushion cover side than the wire, and a locking plate on a cushion frame side is locked to the locking hole.

7 Claims, 4 Drawing Sheets

(56) References Cited

U.S. PATENT DOCUMENTS 3,671,984 A * 6/1972 Ambrose ................ B68G 7/10
297/452.16
4,834,458 A 5/1989 Izumida et al.

FOREIGN PATENT DOCUMENTS

JP 2011-189783 9/2011
JP 2014-8320 1/2014

* cited by examiner

VEHICLE SEAT

INCORPORATION BY REFERENCE

The disclosure of Japanese Patent Application No. 2014-091090 filed on Apr. 25, 2014, including the specification, drawings and abstract, is incorporated herein by reference in its entirety.

BACKGROUND OF THE INVENTION

1. Field of the Invention

The invention relates to a seat mounted on a vehicle such as an automobile, an airplane, a vessel or a trolley.

2. Description of Related Art

In an automobile seat, a surface of a cushion pad placed on a cushion frame is covered by a cushion cover, terminals of the cushion cover in various directions are locked to the cushion frame through hooks provided to correspond to the respective terminals. Accordingly, a seat cushion integrates the cushion pad and the cushion cover to the cushion frame (see Japanese Patent Application Publication No. 2000-184940 (JP 2000-184940 A)). The respective hooks are stitched onto the respective terminals of the cushion cover.

However, stitching of the hooks onto the cushion cover should be performed doubly in terms of strength, a stitch length as a whole gets longer, and the stitching takes time, so producibility decreases.

SUMMARY OF THE INVENTION

In view of such a problem, a task of the invention is to reduce a force applied to a locking unit for locking a terminal of a cushion cover to a cushion frame in a locking structure of the cushion cover at a front end portion of a seat cushion, thereby simplifying stitching for stitching the locking unit onto the terminal of the cushion cover to improve producibility of a seat.

An aspect of the invention relates to a vehicle seat, a terminal of a cushion cover at a front end portion of a seat cushion being locked to a cushion frame, wherein a terminal portion that forms the terminal of the cushion cover is folded back in a direction opposite to a direction in which the terminal portion extends from the cushion cover to form a folded portion, a reinforcing member is enclosed inside the folded portion to stitch the terminal portion, a locking hole that is a through hole is opened in a position of the folded portion closer to the cushion cover side than the reinforcing member, and a locking plate on the cushion frame side is locked to the locking hole.

According to the above aspect of the invention, the terminal portion of the cushion cover can be locked to the cushion frame by locking the locking plate to the locking hole. At the folded portion formed with the locking hole, it is permitted as long as the reinforcing member is enclosed to be folded back and performs stitching at one place, so a stitch length can be shortened as compared with a previous circumstance where hooks are stitched. In a previous structure that the hook are stitched onto the terminal of the cushion cover, a pull force of the cushion cover acting on the hook entirely acts on a stitched portion. In the structure of the above aspect of the invention, a pull force acting on the terminal portion of the cushion cover formed with the locking hole will not directly act on a stitched portion of the folded portion, but is borne by the entire terminal portion of the cushion cover. It is permitted as long as the stitched portion of the folded portion has a strength that only maintains a folded state of the folded portion. Thus, stitching is not required to be performed doubly in the structure of the first invention, and the stitch length can be shortened. Moreover, in the structure of the above aspect of the invention, the reinforcing member exits on the inner side of the folded portion, so the pull force acting on the cushion cover formed with the locking hole is transferred towards an inner side surface of the folded portion via the reinforcing member, and a circumstance where a force that cracks the locking hole is undergone can be avoided.

The terminal portion of the cushion cover can be formed by elongating the cushion cover itself, or by connecting another member to the terminal of the cushion cover. Moreover, the reinforcing member can be of any structure as long as it can bear a force that is transferred from the locking plate to the folded portion via the locking hole and transfer the force towards the inner side surface of the folded portion in a state where the locking hole is locked to the locking plate.

In the above aspect, the reinforcing member may be a wire provided with a ring portion bent into an annular shape, and the locking hole may be formed to correspond to an inner side of the ring portion of the wire.

According to the above aspect, the locking hole is formed to correspond to the inner side of the ring portion of the wire, the locking plate is locked to the locking hole, so the locking plate enters the inner side of the ring portion, and the position of the wire is made not to change freely in the folded portion, which can make the wire inevitably exist between the locking hole and the inner side surface of the folded portion.

The ring portion of the bent wire can make both ends of the bent wire join with each other, or not join but be separated. It is permitted as long as the shape of the wire allows the locking plate to be accommodated in the ring portion and makes the wire not move freely in the folded portion, and makes the wire inevitably exist between the locking hole and the inner side surface of the folded portion. Thus, the ring portion of the wire is not limited to an arc shape, and can be also set to a quadrate shape. Moreover, the number of the ring portions may be only one or plural.

In the above aspect, the wire may be formed with the ring portions at its both end portions, respectively, and the locking holes may be formed to correspond to the respective ring portions at the both end portions.

Previously, the hooks for locking the terminal of the cushion cover to the cushion frame are locked to avoid production of wrinkles at the terminal of the cushion cover, so the hooks are provided in the entire area of the terminal. Thus, an amount of locking operations is large, and producibility is low. According to the above aspect, the locking holes are provided in two places to correspond to the rings of the wire, and a shape of the cushion cover within a wide range between the locking holes is maintained through rigidity of one wire, so locking can be performed while inhibiting production of wrinkles at the terminal of the cushion cover only by locking the two locking holes to the locking plate. Thus, the amount of operation can be reduced as compared with the previous circumstance where the entire area of the hooks is locked.

With respect to the rings at the both end portions of the wire, it is allowed that independent rings are respectively formed at the both end portions of the wire, or that one ring is formed into a flat shape as a whole, a part about the central portion of the ring is removed to make the ring open, and partially open rings are respectively formed at both end portions.

In the above aspect, a tip end, which extends downwards, of the locking plate may be bent at a bent portion towards a rear of the seat cushion; a protruding end, that is closer to a tip end side than the bent portion, of the locking plate may be locked to the locking hole; and a length of the locking plate that protrudes from the bent portion to the tip end may be longer than a length of the inner side of the ring portion of the wire in a front-rear direction.

According to the above aspect, the length of the locking plate that protrudes from the bent portion to the tip end is longer than the length of the inner side of the ring portion of the wire in a front-rear direction, so even if the wire moves relative to the locking plate and a maximum movement is performed in a direction in which a locked state of the two is released, the wire will not escape from the locking plate, and the locked state can be stably maintained.

In the above aspect, in a state where the locking plate is locked to the locking hole, a locking plate side of the reinforcing member or the wire on a tip end side of the terminal portion may be covered by the terminal portion.

According to the above aspect, the locking plate side of the reinforcing member or the wire opposite to the locking plate is covered by the soft cushion cover in the locked state, so both as reinforcing members, the locking plate made of a hard material and the reinforcing member or the wire do not directly contact, which can inhibit occurrence of noise caused by a direct mutual interference between the two.

The cushion cover that covers the locking plate side of the reinforcing member or the wire is required to be sandwiched between the locking plate side of the reinforcing member or the wire and the locking plate as a cushion material, and it is allowed that a part of the locking plate side of the reinforcing member or a part of the wire is covered by the cushion cover. Otherwise, it is allowed that the entire surface is covered, but this is not essential.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
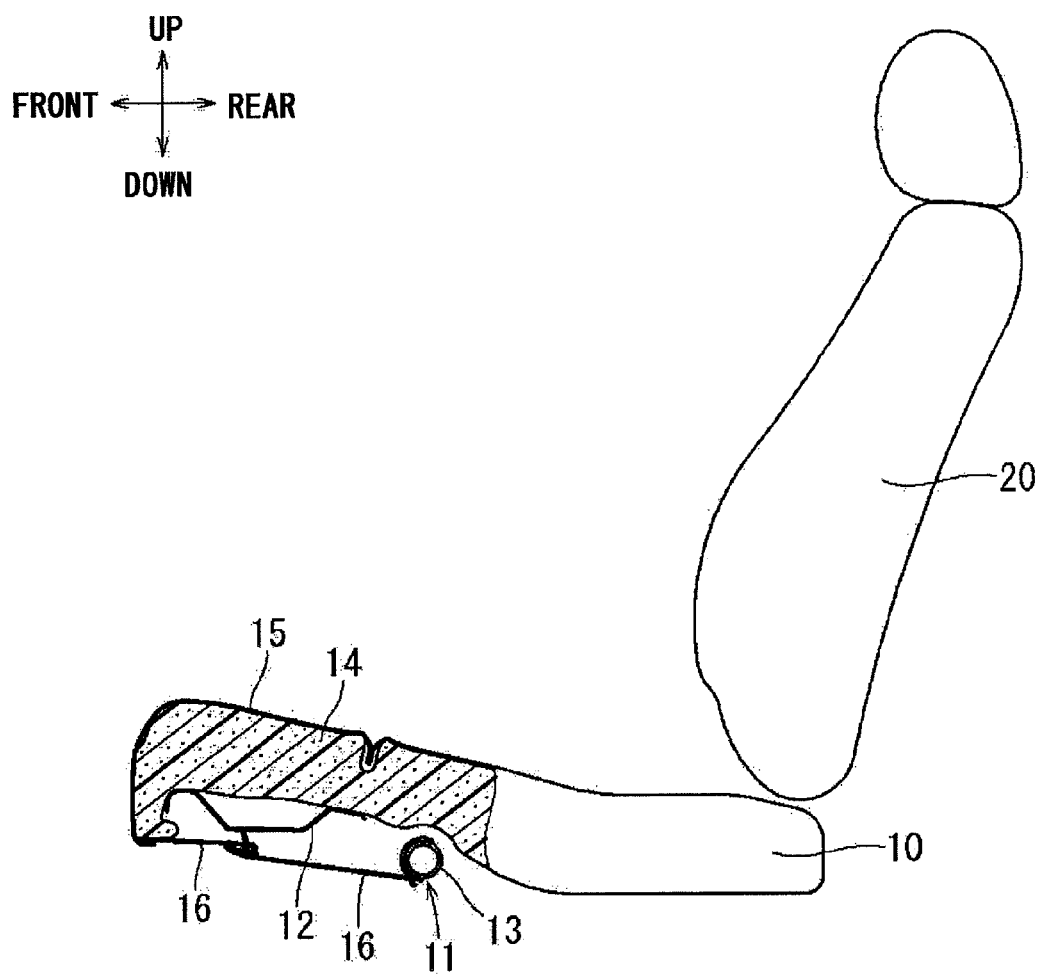
FIG. 1 is a partial sectional side view of a front seat for an automobile according to an embodiment of the invention.

The respective figures show an embodiment of the invention. This embodiment shows an example of applying the invention to a front seat for an automobile (hereinafter referred to as a seat). In the respective figures, various directions when the seat is provided inside the automobile are denoted by arrows. The descriptions of the directions are hereinafter based on the directions denoted by the arrows in the drawings.

Figure 2:
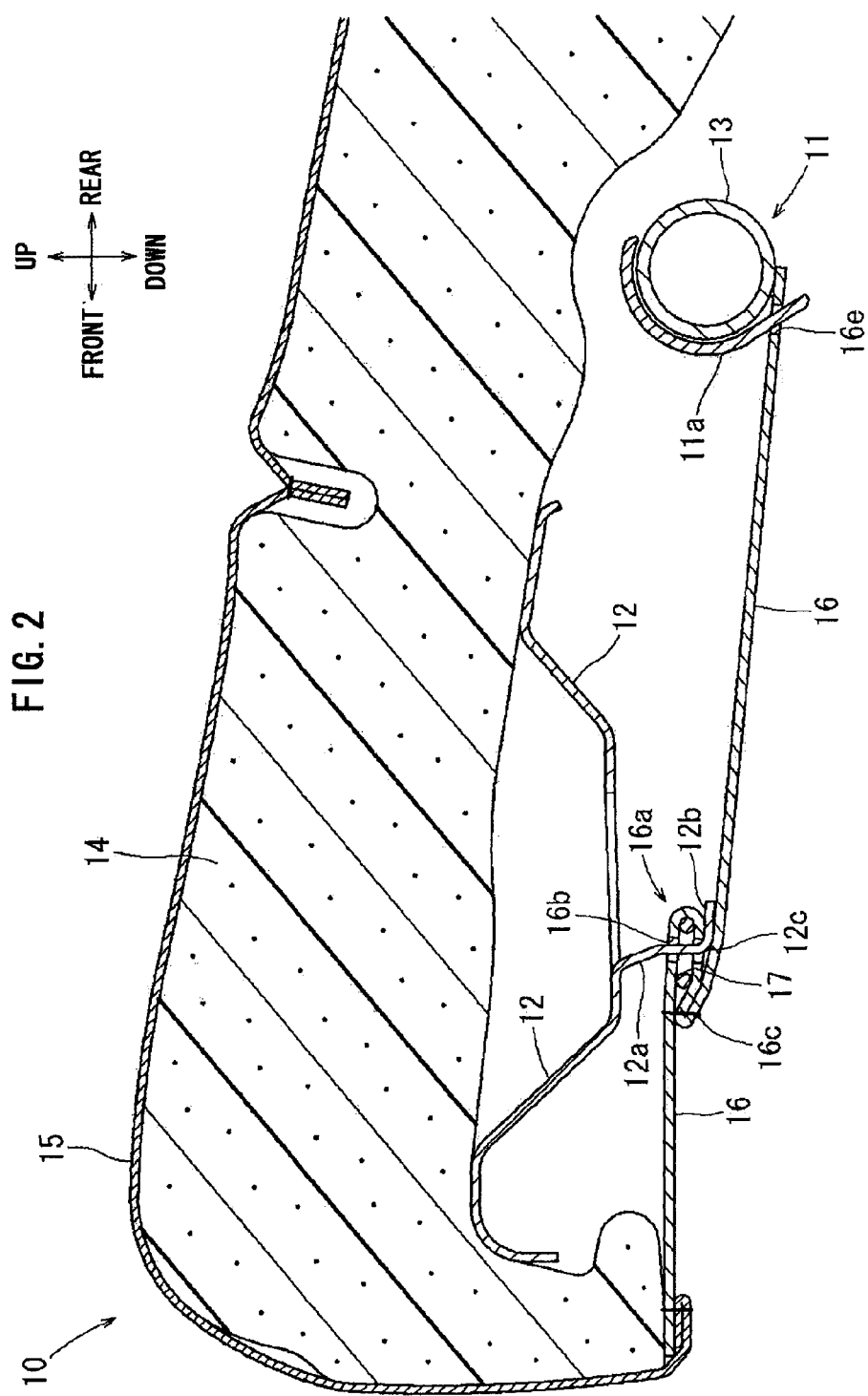
FIG. 2 is a vertical amplified sectional view of a front end portion of a seat cushion in a front-rear direction according to the embodiment.

As shown in FIG. 1, the seat mainly consists of a seat cushion 10 that forms a seat portion and a seatback 20 that forms a back. When a structure of the seat cushion 10 is described in detail, as shown in FIG. 2, in the seat cushion 10, a surface of a cushion pad 14 placed on a cushion frame 11 is covered by a cushion cover 15, and terminals of the cushion cover 15 in various directions are locked to respective portions of the cushion frame 11 to be integrated. The cushion cover 15 at a front portion of the seat cushion 10 is stitched onto a carpet 16 at its terminal (corresponding to a terminal portion of the cushion cover in the invention), and is locked to a front panel 12 that forms a part of the cushion frame 11 via the carpet 16. The cushion cover 15 is a fabric made of natural fibers, synthetic fibers or a combination thereof, and the carpet 16 is formed by a fabric having a higher flexural rigidity than the cushion cover 15. The contents below describe a locking structure of the carpet 16 relative to the cushion frame 11.

Figure 3:
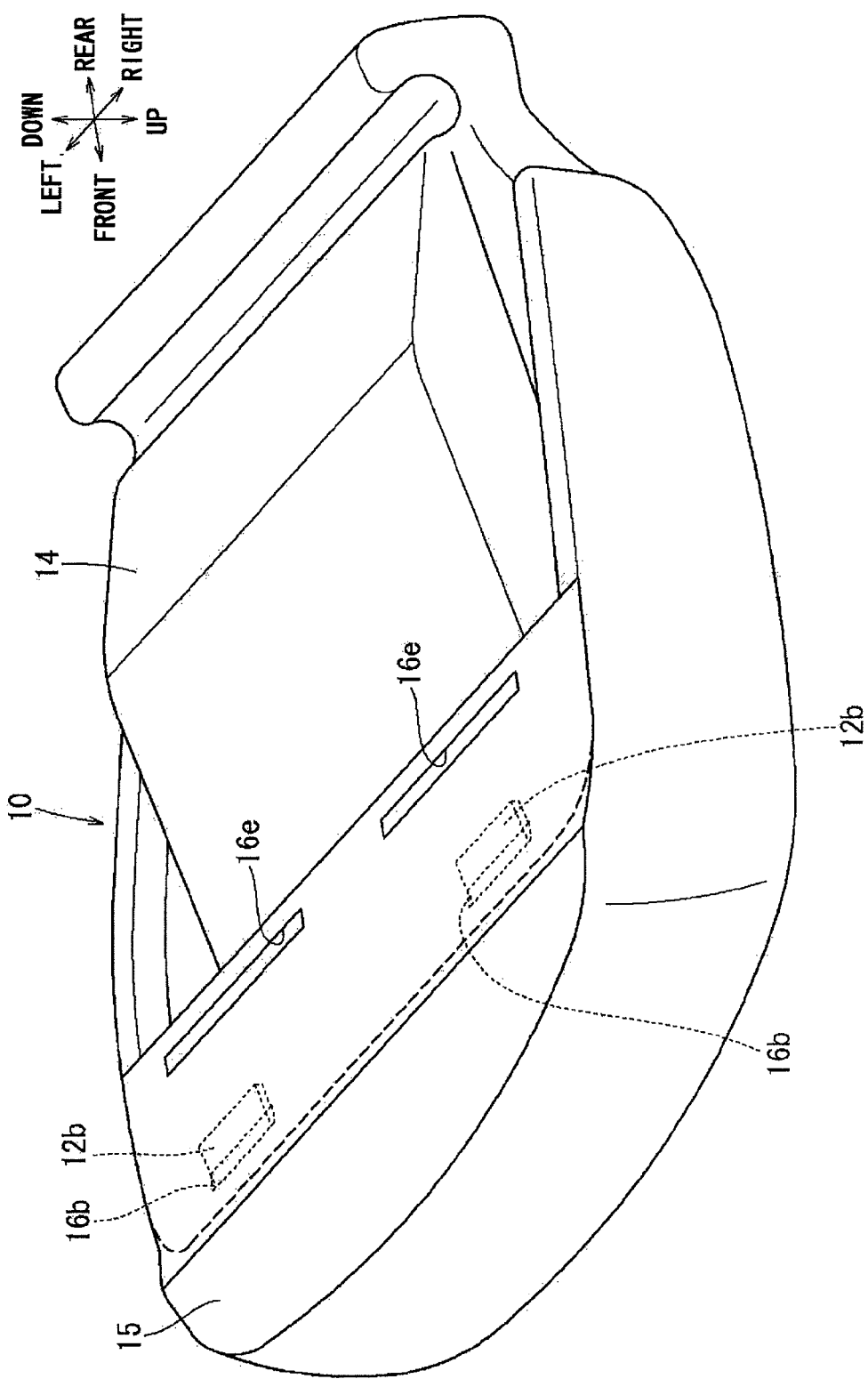
FIG. 3 is a perspective view of a back side of the seat cushion according to the above embodiment.
Figure 4:
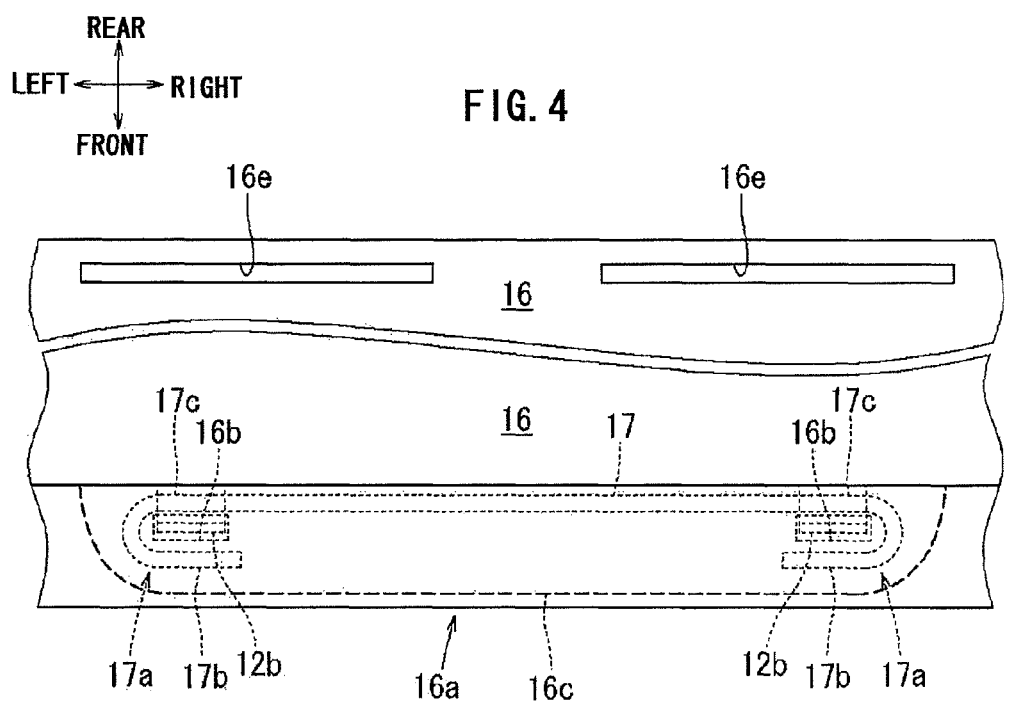
FIG. 4 is a back view of a folded portion of a terminal portion (carpet) of a cushion cover according to the embodiment.

As shown in FIGS. 2-4, locking plates 12a are formed by performing a downward cutting at both end portions of the front panel 12 in a left-right direction, so that a tip end of the carpet 16 is locked at the locking plate 12a. The carpet 16 is folded back from a lower side in a position corresponding to the locking plate 12a from the rear to the front to form a folded portion 16a. A wire 17 (corresponding to an reinforcement member in the invention) bent into an annular shape on both sides is clipped inside the folded portion 16a, and the wire 17 is enclosed within the folded portion 16a to stitch the carpet 16. A stitched portion 16c produced by the stitching is formed in a position close to the wire 17 in a state where the wire 17 abuts against an inner surface of the folded portion 16a, so that the wire 17 cannot move freely in the folded portion 16a. The wire 17 forms ring portions 17a by bending its left and right portions, and locking holes 16b that are through holes are respectively formed on the carpet 16 corresponding to inner sides of the ring portions 17a. The locking hole 16b is sized such that a tip end portion 12b of the locking plate 12a can be inserted, and the tip end portion 12b of the locking plate 12a is inserted to be locked to the locking hole 16b. It should be noted that the illustration of the cushion frame 11 is omitted in FIG. 3.

Thus, the folded portion 16a of the carpet 16 can be locked to the cushion frame 11 by locking the locking plate 12a to the locking hole 16b. It is permitted as long as the folded portion 16a of the carpet 16 formed with the locking hole 16b clips the wire 17 and is folded back to perform stitching at the stitched portion 16c at one place, so the stitch length can be shortened as compared with a conventional structure where hooks are stitched. Under a locking structure by the folded portion 16a, a pull force accompanying locking that acts on the carpet 16 formed with the locking hole 16b does not directly act on the stitched portion 16c of the folded portion 16a, but is borne by the entire carpet 16. It is permitted as long as the stitched portion 16c of the folded portion 16a has a strength that only maintains a folded state of the folded portion 16a. Thus, stitching of the folded portion 16a is not required to be performed doubly, and the stitch length can be shortened. Moreover, in the locking structure of the folded portion 16a, the wire 17 exists at the inner side of the folded portion 16a, so the pull force acting on the carpet 16 formed with the locking hole 16b is transferred towards an inner side surface of the folded portion 16a via the wire 17, thereby a circumstance where a force that cracks the locking plate 12a is undergone can be avoided. Moreover, the wire 17 is annularly bent, the tip end portion 12b of the locking plate 12a enters an inner side of the ring portion 17a, and the carpet 16 is stitched so as to enclose the ring portion 17a. As a result, the position of the wire 17 in the folded portion 16a of the carpet 16 will not change freely, it is possible that the wire 17 inevitably exists between the locking plate 12a and the inner side surface of the folded portion 16a.

In addition, as shown in FIGS. 3 and 4, according to the locking structure by the folded portion 16a, the locking holes 16b are provided in two places to correspond to the ring portions 17a of the wire 17, and a shape of the carpet 16 within a large range between the locking holes 16b is maintained through rigidity of one wire 17, so locking of the folded portion 16a of the carpet 16 can be performed while inhibiting production of wrinkles on the carpet 16 only by locking the two locking holes 16b to the locking plates 12a. Thus, it is not required to provide plural combinations of the locking hole 16b and the locking plate 12a in the left-right direction of the carpet 16. Conventionally, hooks for locking the terminal of the cushion cover to the cushion frame are locked to the terminal of the cushion cover to avoid production of wrinkles, so the hooks are provided in the entire area of the terminal. Thus, the entire area of the hooks is required to be locked, an amount of locking operations is large, and producibility is low. In the above embodiment, the locking operation can be simplified to improve the producibility of the seat.

Figure 5:
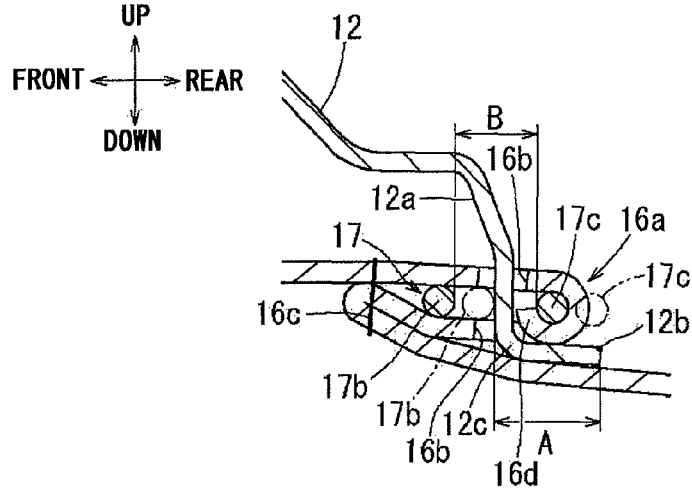
FIG. 5 is an amplified sectional view of the above folded portion and a locking plate according to the embodiment.

As shown in FIG. 5, the locking plate 12a is bent towards the rear on its tip end side, and a length A of the locking plate 12a that protrudes from the bent portion 12c to the tip end is longer than a length B of the ring portion 17a between a front portion 17b and a rear portion 17c of the wire 17. Thus, even if the folded portion 16a and the wire 17 together move relative to the locking plate 12a and a maximum movement is performed in a direction in which a locked state of the folded portion 16a and the wire 17 against the locking plate 12a is released, as shown by an imaginary line, the rear portion 17c of the wire 17 will not escape from the tip end portion 12b of the locking plate 12a, and the locked state can be stably maintained.

In addition, in a state where the locking hole 16b of the carpet 16 is locked to the locking plate 12a, a side of the locking plate 12a of the rear portion 17c of the wire 17 at the ring portion 17a is covered by a part of the carpet 16. Thus, the carpet 16 at a lower portion of the rear portion 17c is bent towards the side of the locking plate 12a to form a bent portion 16d. The bent portion 16d is formed by an operator pressing the carpet 16 on the side of the locking plate 12a of the rear portion 17c of the wire 17 using his/her finger. Thus, the side of the locking plate 12a of the rear portion 17c is covered by a part of the carpet 16, so both as reinforcing members, the locking plate 12a made of iron and the wire 17 do not directly contact, which can inhibit occurrence of noise caused by a direct mutual interference between the two.

As shown in FIGS. 2-4, folding is performed at the folded portion 16a, stitching is performed at the stitched portion 16c, and the carpet 16 remaining on the tip end side is pulled towards a side of the front pipe 13 of the cushion frame 11 to be thereby locked with a spring 11a locked to the front pipe 13. Thus, a locking hole 16e similar to the locking hole 16b of the folded portion 16a is opened at the tip end portion of the carpet 16, and a free end of the spring 11a is inserted into the locking hole 16e. It should be noted that the spring 11a is provided between the front pipe 13 and a rear pipe (not shown) arranged closer to the rear than the front pipe 13 in a tensioning manner to support a lower surface of the cushion pad 14, so an end portion of the spring 11a serves as the free end to protrude towards a lower portion of the front pipe 13.

A specific embodiment is described above, but the invention is not limited by the above appearance and structure, and various changes, additions or deletions can be made within a scope not changing the gist of the invention. For example, in the above embodiment, the invention is applied to a front seat for an automobile, but the invention can be also applied to various seats mounted in an airplane, a vessel, a trolley or the like.

What is claimed is:

1. A vehicle seat, comprising:
   a seat cushion;
   a cushion cover that covers the seat cushion, the cushion cover having a main portion and a terminal portion; and
   a cushion frame, having a locking plate that locks the terminal portion of the cushion cover, wherein
   the terminal portion of the cushion cover has a folded portion that is folded back in a direction opposite to a direction in which the terminal portion extends from the cushion cover,
   a reinforcing member, which is a wire, is enclosed inside the folded portion of the terminal portion,
   the terminal portion has a locking hole in a position of the folded portion closer to a cushion cover side than the reinforcing member,
   the locking plate is locked to the locking hole,
   the wire is provided with a ring portion bent into an annular shape,
   the locking hole is formed to correspond to an inner side of the ring portion of the wire, and
   the ring portion is formed at an end portion of the wire, and the locking hole is formed to correspond to the ring portion at the end portion of the wire.

2. The vehicle seat according to claim 1, wherein the terminal portion is formed by a fabric having a higher flexural rigidity than a flexural rigidity of the main portion of the cushion cover.

3. The vehicle seat according to claim 1, wherein the ring portion is a pair of ring portions and each ring portion of the pair of ring portions is formed at a respective end portion of the wire, and the locking hole is a pair of locking holes and each locking hole of the pair of locking holes is provided to correspond to one of the pair of ring portions formed at each respective end portion of the wire.

4. The vehicle seat according to claim 1, wherein the terminal portion is stitched so as to enclose the ring portion.

5. The vehicle seat according to claim 1, wherein a tip end, which extends downwards, of the locking plate is bent at a bent portion towards a rear of the seat cushion,
   a protruding end, that is closer to a tip end side than the bent portion, of the locking plate is locked to the locking hole, and
   a length of the locking plate that protrudes from the bent portion to the tip end is longer than a length of the inner side of the ring portion of the wire in a front-rear direction.

6. The vehicle seat according to claim 1, wherein in a state where the locking plate is locked to the locking hole, a locking plate side of the reinforcing member on a tip end side of the terminal portion is covered by the terminal portion.

7. The vehicle seat according to claim 1, wherein
in a state where the locking plate is locked to the locking hole, a locking plate side of the wire on a tip end side of the terminal portion is covered by the terminal portion.

* * * * *